United States Patent
Martelli et al.

(10) Patent No.: US 8,071,172 B2
(45) Date of Patent: Dec. 6, 2011

(54) PROCESS FOR MANUFACTURING DEVICES CARRYING AT LEAST ONE ACTIVE MATERIAL BY DEPOSITION OF A LOW-MELTING ALLOY

(75) Inventors: Daniele Martelli, Milan (IT); Alessio Corazza, Como (IT); Giovanni Salvago, Gerenzano (IT); Luciano Pisoni, Marcallo con Casone (IT)

(73) Assignee: Saes Getters S.p.A., Lainate MI (IT)

( * ) Notice: Subject to any disclaimer, the term of this patent is extended or adjusted under 35 U.S.C. 154(b) by 363 days.

(21) Appl. No.: 11/721,046

(22) PCT Filed: Dec. 20, 2005

(86) PCT No.: PCT/IT2005/000744
§ 371 (c)(1),
(2), (4) Date: Jun. 7, 2007

(87) PCT Pub. No.: WO2006/070426
PCT Pub. Date: Jul. 6, 2006

(65) Prior Publication Data
US 2009/0022892 A1    Jan. 22, 2009

(30) Foreign Application Priority Data
Dec. 27, 2004  (IT) .............. MI2004A2516

(51) Int. Cl.
*B05D 5/00* (2006.01)
(52) U.S. Cl. .......... 427/284; 427/256; 427/271
(58) Field of Classification Search ........ 427/271.1, 427/256, 284
See application file for complete search history.

(56) References Cited

U.S. PATENT DOCUMENTS

| | | | |
|---|---|---|---|
| 3,519,864 | A | 7/1970 | Gungle et al. |
| 3,525,009 | A | 8/1970 | Someya et al. |
| 3,733,194 | A | 5/1973 | Porta et al. |
| 3,764,842 | A | 10/1973 | Ridders et al. |
| 3,794,402 | A | 2/1974 | Ridders et al. |
| 4,056,750 | A | 11/1977 | Latassa |
| 4,182,971 | A | 1/1980 | Cassidy |
| 4,278,908 | A | 7/1981 | Antonis |
| 4,282,455 | A | 8/1981 | Latassa et al. |
| 4,461,981 | A | 7/1984 | Saikatsu et al. |
| 4,529,628 | A | 7/1985 | Haour et al. |
| 4,542,319 | A | 9/1985 | Grenfell et al. |
| 4,754,193 | A | 6/1988 | Holmes et al. |
| 4,806,441 | A * | 2/1989 | Brezillon ............. 429/241 |

(Continued)

FOREIGN PATENT DOCUMENTS
EP    0 359 724 A2    3/1990
(Continued)

*Primary Examiner* — Michael Cleveland
*Assistant Examiner* — Xiao Zhao
(74) *Attorney, Agent, or Firm* — Panitch Schwarze Belisario & Nadel LLP

(57) ABSTRACT

A process is provided for manufacturing devices that carry an active material. The process involves the continuous deposition of a strip of low-melting alloy in the liquid state on a ribbon of a metal net or a micro-perforated and stretched sheet metal, which surface has been pre-treated, for example by means of deoxidation. The ribbon is preferably prepared for subsequent cutting into individual components with active material. The deposition can occur by immersion into laminar wave or into a constant jet, by spraying of small drops or by liquid dispensation.

10 Claims, 1 Drawing Sheet

U.S. PATENT DOCUMENTS

| | | | |
|---|---|---|---|
| 4,823,047 A | 4/1989 | Holmes et al. | |
| 4,855,643 A | 8/1989 | White | |
| 4,972,118 A * | 11/1990 | Yorifuji et al. | 313/565 |
| 5,077,094 A | 12/1991 | McCall et al. | |
| 5,712,048 A | 1/1998 | Buresch et al. | |
| 5,789,855 A | 8/1998 | Forsdyke et al. | |
| 5,798,618 A | 8/1998 | Os et al. | |
| 5,825,127 A | 10/1998 | Weinhardt | |
| 6,043,603 A | 3/2000 | Weinhardt | |
| 6,080,173 A * | 6/2000 | Williamson et al. | 606/184 |
| 6,169,361 B1 | 1/2001 | Boffito et al. | |
| 6,923,998 B2 * | 8/2005 | Forry et al. | 427/183 |

FOREIGN PATENT DOCUMENTS

| | | |
|---|---|---|
| JP | 60-193253 A | 10/1985 |
| JP | 6-76796 A | 3/1994 |
| JP | 6-96728 A | 4/1994 |
| WO | 97/19461 A1 | 5/1997 |

* cited by examiner

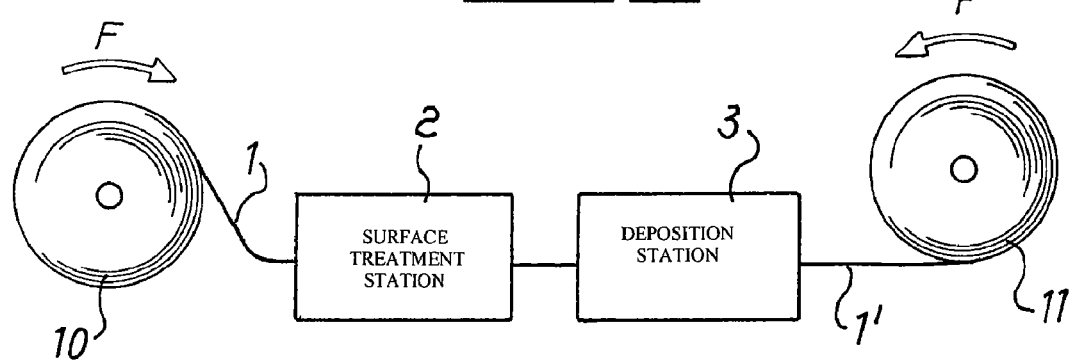
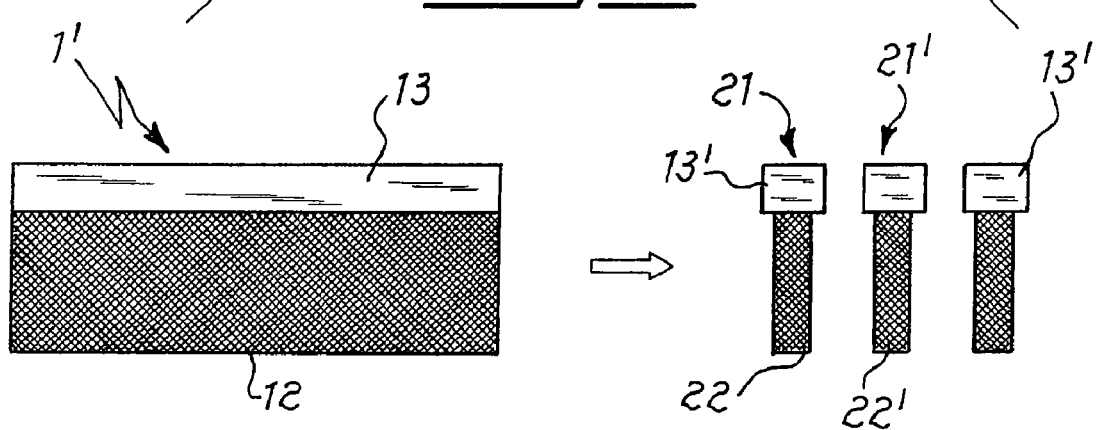

US 8,071,172 B2

PROCESS FOR MANUFACTURING DEVICES CARRYING AT LEAST ONE ACTIVE MATERIAL BY DEPOSITION OF A LOW-MELTING ALLOY

CROSS-REFERENCE TO RELATED APPLICATIONS

This application is a Section 371 of International Application No. PCT/IT2005/000744, filed Dec. 20, 2005, which was published in the English language on Jul. 6, 2006, under International Publication No. WO 2006/070426 A2 and the disclosure of which is incorporated herein by reference.

BACKGROUND OF THE INVENTION

The present invention relates to a process for manufacturing devices that carry an active material, particularly on a lateral edge thereof, based on the deposition of a low-melting alloy.

Numerous applications are known in the prior art which require that inside a manufactured product a material is introduced having a specific activity necessary for the correct functioning of the manufactured product itself. Of particular significance among these applications is the production of lamps, so that in the following description reference is made to devices used in gas lamps, keeping in mind, however, that the process according to the invention can also be utilized advantageously to manufacture devices for different uses.

In the gas lamps industry it is known that various active materials have to be introduced into the lamp, e.g., compounds for mercury release, amalgams for the pressure control of that element in the case of fluorescent lamps, getter materials for the removal of undesired gases from the internal atmosphere of the lamp, which may damage the functioning thereof, or materials emitting particular gases, such as oxygen. The use of these materials, as well as the devices that allow their introduction into the lamps, are the subject of numerous patent documents, such as U.S. Pat. Nos. 3,764,842; 3,794,402; 4,056,750; 4,182,971; 4,278,908; 4,282,455; 4,542,319; 4,754,193; and 4,823,047; and Japanese patent application publications A-60-193253; A-06-096728 and A-06-076796, all relating to devices for introducing inside lamps elemental mercury or a material capable of releasing this element; U.S. Pat. Nos. 3,525,009; 4,461,981 and 4,855,643, all relating to getter devices for the use in lamps; U.S. Pat. Nos. 5,825,127 and 6,043,603 and European patent application publication EP-A-0359724, all relating to devices that combine both the functions of mercury release and gettering integrated to each other; U.S. Pat. No. 5,789,855 and U.S. Pat. No. 5,798,618 both relating to amalgams for mercury pressure control inside the lamp; and U.S. Pat. Nos. 3,519,864 and 6,169,361, both relating to devices for oxygen release inside of lamps.

The devices described in these patent documents are generally manufactured by introducing the active material in a container or by applying it on the surface of a support, and then by fixing the container or support to an adequate prop, which is then mounted in a pre-determined position in the lamp.

However, the manufacturing of these devices is generally rather complex, requiring the mechanical shaping of (generally metallic) small size parts and the assembly of these to each other in various ways. The problem becomes even more serious when considering the present tendency in the lamp industry to miniaturization, which imposes that the above-mentioned devices also be miniaturized. Furthermore, this miniaturization also involves a greater control, both geometrical and dimensional, of these devices, because in the finished lamp these are all arranged in the same zone (the terminal portion of the lamp or at most the two terminal portions in the case of tubular lamps), while avoiding having these devices come into contact with the electrodes or their supports. A contact of this type could in fact change the lamp functioning. Moreover, adopting production processes in which the device is manufactured by assembling (mechanically or through welding) pre-formed parts results in a reproducibility problem as to the shape and size of the finished devices.

Another problem that arises in the production of the devices, made more serious by the miniaturization thereof, is that in some instances it is possible to have particularly delicate manufacturing steps that imply a possible risk of compromising the semi-manufactured product. For example, in the case in which a device must be manufactured having an amalgam for the mercury pressure control, introducing the amalgam into (or affixing onto) the final piece turns out to be a complex operation, which requires the mechanical moving of a piece, generally having a non-planar shape. In contrast, working a part already having the amalgam thereon, e.g., performing a welding between this part and its support, may compromise the adhesion of the amalgam itself on the part. Finally, all these construction problems result in relatively high costs of the devices, especially when compared to the low selling price of the lamps, such that their use is often limited by economic reasons.

BRIEF SUMMARY OF THE INVENTION

The object of the present invention is to provide a process for manufacturing devices carrying an active material, which is free of the above listed problems of the prior art.

The object is obtained according to the present invention with a process comprising the steps of preparing a ribbon of a metallic material and depositing along a lateral edge of the ribbon at least one strip of active material in the form of a low-melting alloy in the melted state, wherein the ribbon is formed of a metal net or a perforated metal band, pre-treated to eliminate passivated surface layers.

Individual devices can then be obtained by cutting suitable sections of the ribbon, which can be prepared beforehand for cutting by a preliminary punching step through the introduction of parallel transverse weakened lines.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a schematic, top plan view of an embodiment of carrying out the process according to the invention; and FIG. 2 is a schematic view of a segment of the ribbon used in the process according to the invention, after the deposition of the layer of active material, according to the embodiment in FIG. 1, from which some devices are formed by cutting (in the drawing three pieces are shown).

DETAILED DESCRIPTION OF THE INVENTION

The ribbon may be a simple metal net or, alternatively, a so-called "stretched micro-perforated sheet metal." This latter product (simply referred to hereinafter as "stretched sheet metal") is obtained by providing micro-holes in a metal band, preferably in an ordered pattern on the band, and then stretching the band so as to cause a widening of the holes. The use of the metal net ribbon or stretched sheet metal in the process according to the invention allows avoiding any step of fixing a support to the part of the device on which the active material is provided, and also the steps for the containment of the active material in those devices which require it. In fact, the material in question, in the form of a low-melting alloy in its melted state, ensures its perfect adhesion to the perforated substrate owing to the dimensional characteristics of the holes and to the morphology of the areas of the metallic ribbon between the holes. As a result of the perforation step, these areas of the ribbon have a non-planar, but slightly drawn surface between adjacent holes, thus resulting in formation of a preferential path, along which the melted material rises due to a phenomenon similar to capillarity, thereby wetting the whole surface onto which the active product must be applied.

Both the metal nets and the stretched sheet metal bands used in the process according to the invention are commercially available and are sold, e.g., by the company Fratelli Mariani S.p.A. of Milan, Italy. It is essential for the purpose of the present invention, in order to allow a good adhesion of the deposited alloy on the ribbon itself, that the nets or stretched sheet metal bands forming the substrate for the devices to be produced, be pre-treated in a such way as to remove the passivated surface layers, mainly of oxide but also of greasy substances, normally present on the metal. For this purpose, use can be made of steps of mechanical surface abrasion or of acid solutions or corrosive components suitable for the removal of the passivated surface layers. For this purpose deoxidizing or pickling liquids or powders are known, capable of attacking the thin films of oxide and possibly of grease present on the metal surface.

It is further fundamental that the substrate have optimal dimensional characteristics to capture in its perforated structure a certain amount of melted alloy in a precise and reproducible way. The size of the holes must be sufficiently small in order to prevent the liquid alloy from forming drops or percolation. It has been found that the preferred geometric characteristics, particularly to exploit the phenomena of capillarity to fill holes and channels with the alloy, are related to the thickness of the substrate, the dimensions of the holes and the center distance between a row and/or a column of holes and the adjacent one. The first value, relative to the thickness, is between 0.20 and 0.50 mm; the second dimensional value, relative to the holes of the ribbon of sheet metal forming the substrate, is such that a circle inscribed therein has a diameter that is smaller than 0.45 mm; while the above-mentioned center distances will be between 0.55 and 1.10 mm, with a ratio between the holed area and the solid material of the overall surface being between 12 and 25%.

With reference to FIG. 1, the process according to the present invention is schematically represented by showing the ribbon of stretched metal sheet 1 coming from the perforation step being continuously unrolled from a coil 10, which rotates in the direction of the arrow F moving forward in a vertical plane, perpendicular to the plane of the drawing. Ribbon 1 first encounters a station 2 for surface treatment to eliminate the passivated surface layers by mechanical or chemical deoxidation action. As previously mentioned, this surface treatment is necessary to allow the following deposition of the liquid alloy, which occurs downstream along the path of ribbon 1, in the station schematically indicated by the block 3. Ribbon 1' comes out of the deposition station 3 with the active product deposited along the lower edge, opposite to that visible in FIG. 1, over a pre-established width of the lower lateral edge. Ribbon 1' is then wound up on a coil 11 on the right side of FIG. 1, rotating in the direction of the arrow F'. Of course, means are provided to rotate the coil 11 and possibly coil 10, but coil 10 can instead be idle and pulled into rotation by the ribbon itself.

The ribbon is better shown in front view in FIG. 2. The edge 13 of the ribbon 1' is covered with active material made of a low-melting alloy, applied in the melted state in passing through the deposition station 3 of FIG. 1. Edge 13 is distinguished from the substrate 12, which is still perforated and possibly subjected to a surface pre-treatment.

Low-melting alloys suitable for the purpose of the invention are, for example indium-based alloys with a high content of that element, such as binary indium-silver or indium-tin alloys or ternary indium-silver-copper or indium-silver-nickel alloys containing in each case at least 80% by weight of indium. Other materials with suitable characteristics are bismuth-based alloys, for example bismuth-indium alloys, bismuth-tin alloys or ternary alloys, such as bismuth-tin-lead alloys, containing in each case at least 50% by weight of bismuth.

Still with reference to FIG. 2, there is shown schematically how ribbon I' is subsequently cut in the direction orthogonal to its longitudinal extension, so as to obtain the desired single devices 21, 21', . . . . To facilitate the cutting operation, ribbon 1 can be prepared, before or after the surface treatment 2, with adequate weakened or punched lines, along which the feet 22, 22' . . . of each device can be obtained, apart from some easily eliminable cut-offs, each foot being narrower than the head zone 13, 13', . . . , carrying the active material.

The deposition step of the low-melting alloy in the liquid state can be performed in various ways, among which the following can be mentioned:

a) by partial immersion into a laminar standing wave, a known technique, for example, in certain welding applications;

b) by partial immersion into a liquid jet or gush kept at constant level;

c) by spraying of small drops from a suitable nozzle; and d) by liquid dispensation from a suitable dispenser.

When the process is finished, and the active product of strip 13 along the edge of ribbon 1' is stabilized, the ribbon itself can undergo a new process as in FIG. 1. In this new process the ribbon is passed through the surface treatment station 2 and the deposition of liquid alloy station 3 with inversely positioned edges, i.e., with the already deposited strip 13 turned upwards (as in FIG. 2). The edge opposite to that of the strip 13 can undergo the surface treatment (if not already done prior to the first deposition). A symmetrical strip of an active product is then produced in the operative block 3 of FIG. 1, according to one of the previously-mentioned methods. In this way, a ribbon will be obtained having on both opposite edges thereof a strip of deposited active material, whereby with a median longitudinal cut it is possible to have two symmetrical ribbons from which a double series of individual devices as 21, 21' . . . can be obtained.

Before proceeding to the cutting of the ribbon, as described above, to obtain the individual desired devices, if the deoxidation operation has left residuals, a further washing step can be foreseen for their elimination.

The invention will be further illustrated by the following examples.

EXAMPLE 1

A ribbon of stretched sheet metal of nickel-plated iron is produced having a thickness of 0.35 mm, a square mesh perforation with a diameter of the circle inscribed in each hole of 0.28 mm, the center distances between the rows of holes equal to 0.71 mm and between the columns of holes equal to 0.85 mm, and the thickness of the nickel layer being about 1 µm. The ribbon is subjected to a surface deoxidation treatment and then immersed in a bath of an alloy in the liquid state having a weight percentage composition of In 94%-Ag 6%, thereby succeeding to capture an amount of material equal to 110.8±6.0 mg/cm².

EXAMPLE 2

The process of Example 1 is repeated with the only difference that the ribbon is wetted with the liquid alloy by passage thereof in vertical position through a laminar wave of the liquid alloy, rather than by simple immersion of the edge into the bath. This Example results in obtaining the capture of 110.2±3.3 mg/cm² of alloy, namely with a smaller margin of uncertainty.

EXAMPLE 3

The process of Example 1 is repeated using a ribbon of stretched sheet metal of nickel-plated iron having a thickness of 0.40 mm, a square mesh perforation with a diameter of the circle inscribed in each hole of 0.26 mm, the center distances between rows of holes equal to 0.84 mm and between the columns of holes equal to 0.95 mm, and the thickness of the nickel layer being about 1 µm. The amount of In—Ag alloy captured is equal to 112.8±5.4 mg/cm².

EXAMPLE 4

The process of Example 3 is repeated, adopting however in this case the wetting method of Example 2 (passing the metal band through a laminar wave of the liquid alloy). In this case also a higher reproducibility is obtained, with a loaded amount of 110.8±3.5 mg/cm².

The Examples show that the process of the invention is capable of producing metal nets or micro-perforated bands with deposits of desired materials without any formation of drops or abnormal material deposits. The process is characterized by highly reproducible amounts of deposited material, particularly when the wetting method employed is by passing the net or band through a laminar wave of the liquid material.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A process for mass-production of devices (21, 21', . . . ) carrying at least one active material, comprising the steps of preparing a ribbon (1) of metallic material having holes in a form of a metal net or a perforated metal band, pre-treating the ribbon to eliminate passivated surface layers, and depositing along a lateral edge of the ribbon at least one strip (13) of active material in a form of a low-melting alloy in a melted state, such that an amount of the melted alloy is captured by the holes and adheres the active material in the holes of the lateral edge of the ribbon.

2. The process according to claim 1, wherein the ribbon of metallic material has a thickness between 0.20 and 0.50 mm; the holes have dimensions such that a circle inscribed in one of the holes has a diameter smaller than 0.45 mm; and a center distance between adjacent rows or columns of holes is between 0.55 and 1.10 mm.

3. The process according to claim 1, wherein the pre-treating step comprises continuously passing at least one lateral edge of the ribbon through a deoxidizing bath, and the depositing step comprises subsequently passing the ribbon into a bath of a low-melting liquid alloy.

4. The process according to claim 3, wherein the depositing step occurs by partial immersion of a lower edge of the ribbon (1), held vertically, into a laminar wave of the low-melting liquid alloy.

5. The process according to claim 3, wherein the depositing step occurs by keeping a lower edge of the ribbon (1) in a vertical position and hitting the lower edge at constant level by a gush or jet of the low-melting liquid alloy.

6. The process according to claim 1, wherein the low-melting alloy is a binary or ternary indium-based alloy comprising at least 80% by weight of indium.

7. The process according to claim 1, wherein the low-melting alloy is a binary or ternary bismuth-based alloy comprising at least 50% by weight of bismuth.

8. The process according to claim 1, further comprising, subsequent to the depositing step, a step of cutting the ribbon along parallel lines orthogonal to its longitudinal extension, to obtain individual devices (21, 21', . . . ) carrying active material.

9. The process according to claim 8, further comprising preparing the ribbon for the cutting step by punching along transverse lines.

10. The process according to claim 8, further comprising, after the deposition step and before the cutting step, a step of cleaning the ribbon for elimination of residuals of the pre-treating step.

* * * * *